F. C. RUPPEL.
MOLD FOR HOLLOW BODIES.
APPLICATION FILED NOV. 1, 1920.

1,388,376.

Patented Aug. 23, 1921.
3 SHEETS—SHEET 1.

INVENTOR.
Frederick C. Ruppel.
BY
Edward N. Pagelsen,
ATTORNEY.

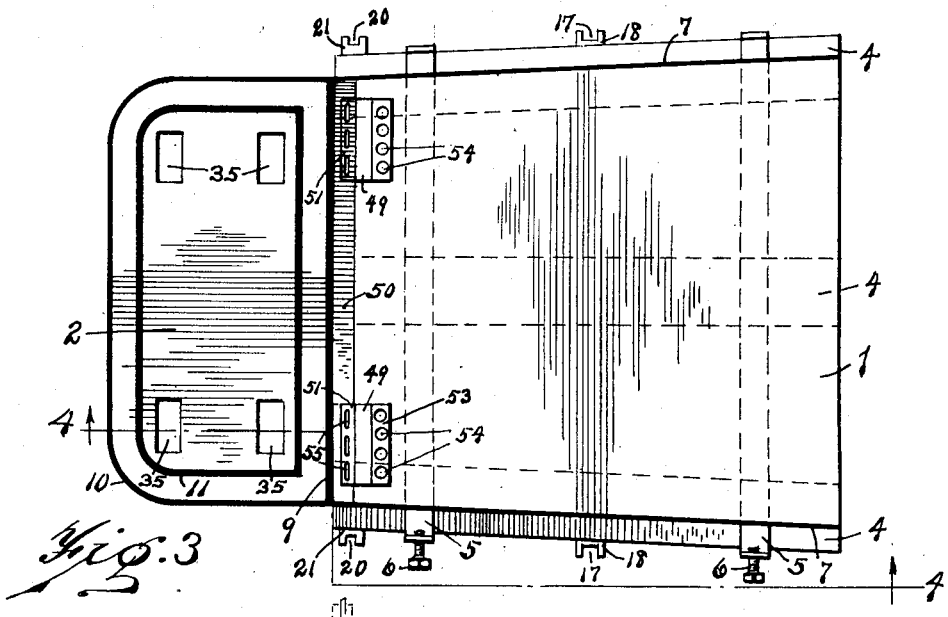
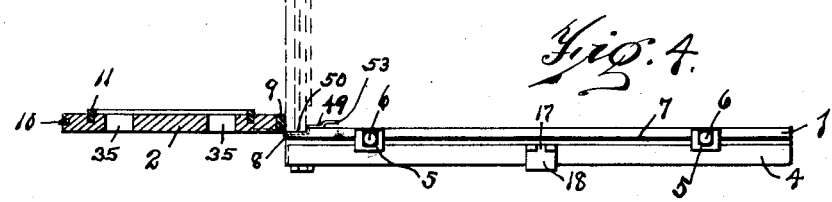
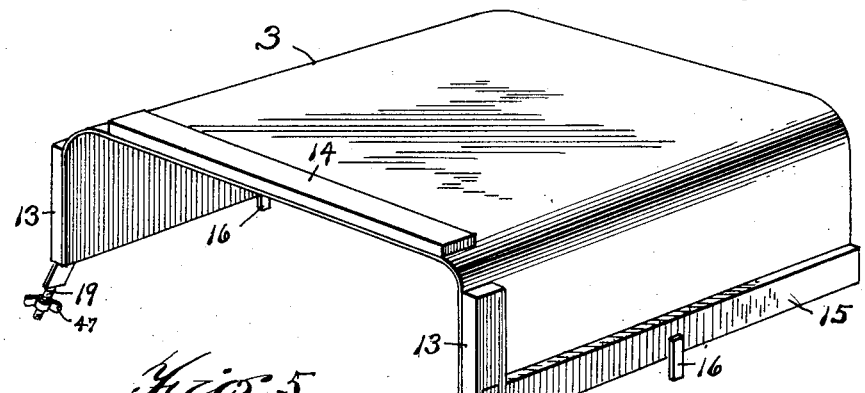

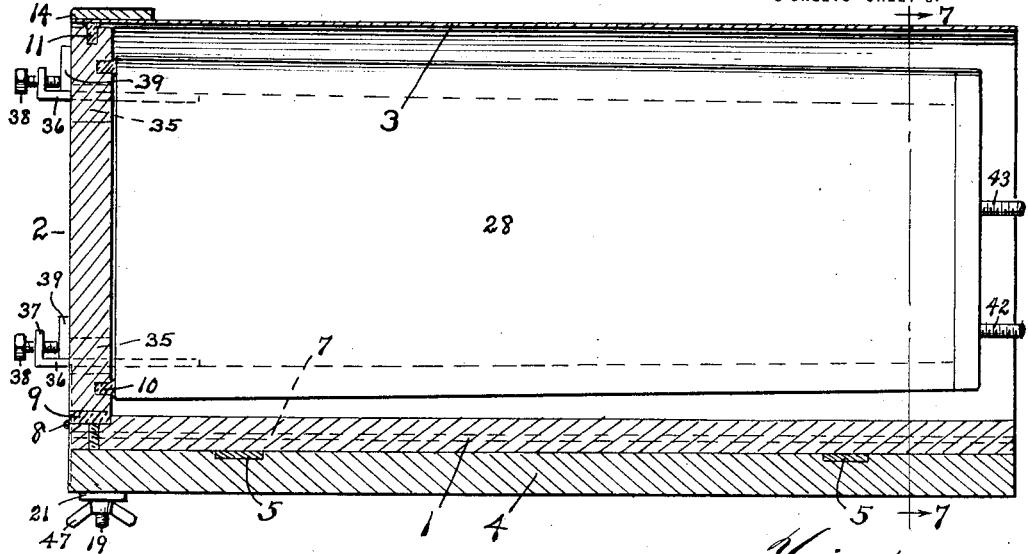
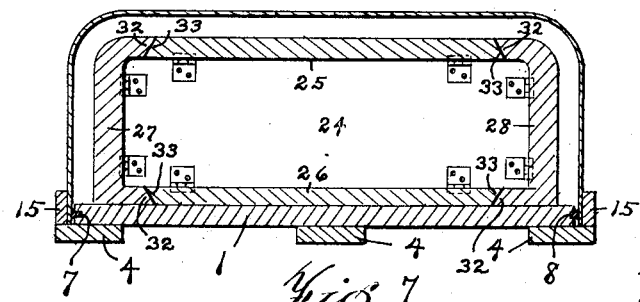
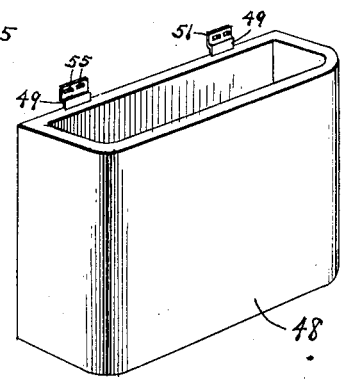
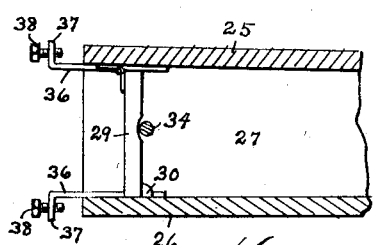

UNITED STATES PATENT OFFICE.

FREDERICK C. RUPPEL, OF GRAND RAPIDS, MICHIGAN, ASSIGNOR TO HAYES-RUPPEL MANUFACTURING COMPANY, OF GRAND RAPIDS, MICHIGAN, A CORPORATION OF MICHIGAN.

MOLD FOR HOLLOW BODIES.

1,388,376.   Specification of Letters Patent.   Patented Aug. 23, 1921.

Application filed November 1, 1920. Serial No. 420,966.

*To all whom it may concern:*

Be it known that I, FREDERICK C. RUPPEL, a citizen of the United States, and residing at Grand Rapids, in the county of Kent and State of Michigan, have invented a new and Improved Mold for Hollow Bodies, of which the following is a specification.

This invention relates to the construction of molds for the forming of hollow bodies from plastic materials, and its object is to provide a construction of this character which can be readily separated from the molded body and which will not leak.

I have found that when molds for concrete and other plastic materials are not water-tight that the plastic mass, at the points where it has set, often has air holes and has less strength at the points where the water is permitted to leak out than the remainder of the molded body. But when the mold is so constructed that the water in the plastic mass is prevented from escaping, sufficient water may be employed to produce the best results, and when the plastic mass has set, the concrete is hard and uniform in its qualities.

This invention consists therefore in a mold formed of an outer shell and a core, the core being collapsible and the outer shell being formed of several parts, the joints between the several parts being rendered water-tight by means of strips of rubber or other packing.

It also consists in forming the shell of rigid portions hinged together and a sheet metal portion adapted to be secured water-tight to the rigid portions.

It further consists in the details of construction illustrated in the accompanying drawings and particularly pointed out in the claims.

Figure 2:
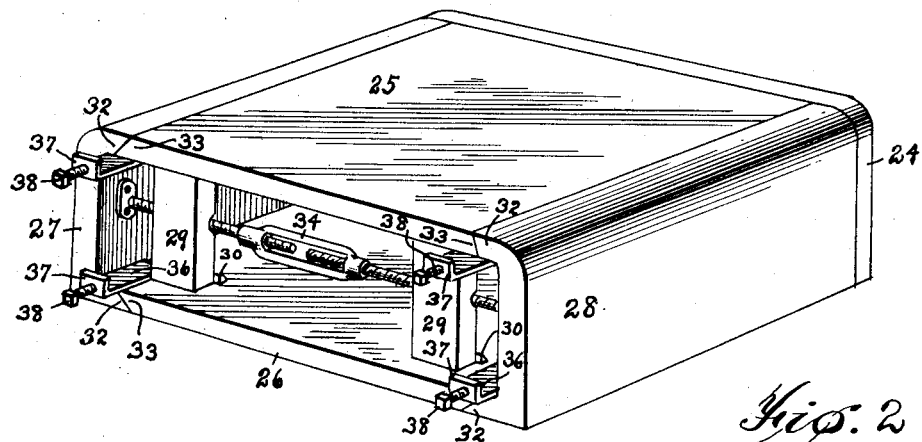
Figure 1:
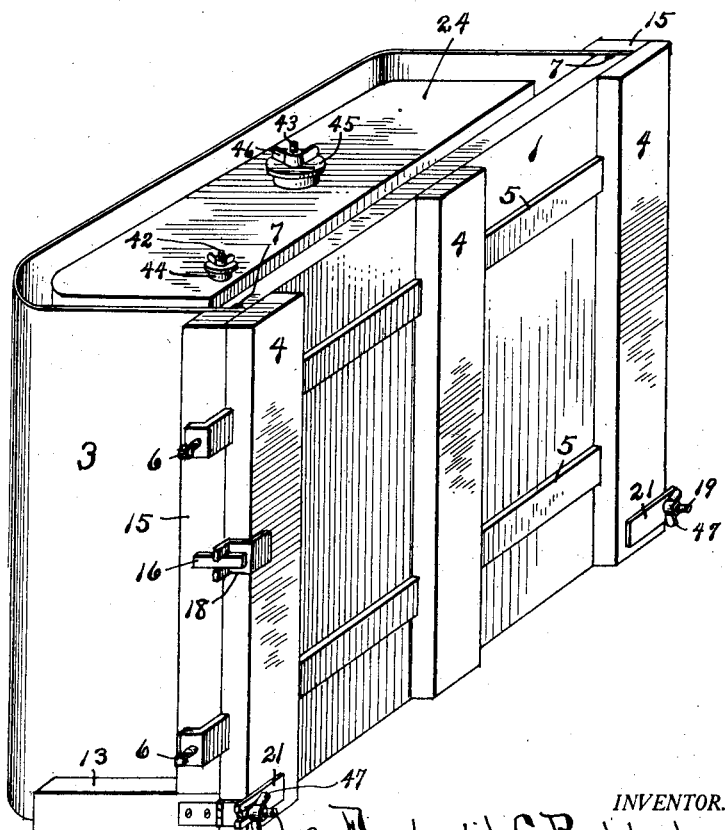

In the drawings, Figure 1 is a perspective of my improved mold when constructed especially for the water tanks of water-closets. Fig. 2 is a perspective of the core therefor when expanded. Fig. 3 is a plan of the back board of the shell of the mold and the bottom hinged thereto. Fig. 4 is a section on the line 4—4 of Fig. 3. Fig. 5 is a perspective of the sheet metal portion of the shell. Fig. 6 is a view showing the core mounted in the shell, the side of the latter being broken away. Fig. 7 is a section on the line 7—7 of Fig. 6. Fig. 8 is a central section of one end of the core. Fig. 9 is a perspective of the tank which may be formed in the present mold.

Similar reference characters refer to like parts throughout the several views.

The mold shown in the drawings comprises an outer shell and a core. The shell comprises a rigid back board 1, a bottom 2 hinged thereto, and a sheet metal portion 3 adapted to be secured to the side 1 and the bottom. As shown in Figs. 1, 3, 4, 6 and 7, the back board 1 has the stiffening members 4, which are cut away to receive the metal clamping bars 5 having set screws 6 in one end. The side edges of this back board are preferably grooved to receive the packing strips 7 of rubber. The stiffening members 4 along the edges of the back board project for purposes to be given farther on.

Connected to the lower end of the back board by means of the hinges 8 is the bottom 2 and a strip 9 of rubber is preferably attached to the adjacent edge of the bottom to form a water-tight joint between the two. As shown in Figs. 3 and 4, the remaining edges of this bottom are grooved to receive the packing strip 10 and the inner face is also grooved to receive the packing strip 11.

The sheet metal part 3, which constitutes three sides of the shell, has slats 13, 14 and 15 along its edges, the slats 15 having dowel pins 16 adapted to fit the notches 17 in the brackets 18 attached to each side edge of the back board 1. Hinged to the ends of each slat 13 is a bolt 19 adapted to enter the notch 20 in a small plate 21 attached to the back board 1, as indicated in Fig. 1, so that this sheet metal member may be drawn tightly against the packing ring 10 in the edge of the bottom 2, when the parts are in the positions shown in Figs. 1 and 6. The side slats 15 are also drawn down against the bracing members 4 of the side 1 and the clamps 5 together with the set screws 6 force the side slats 15 and the sheet metal against the packing strips 7 in the edges of the back board 1. The joints between the parts of the shell of the mold are thereby made water-tight. The slats 14 stiffen the edge of the shell and assist to prevent leakage.

The core of the mold is made of the end 24 to which the wide sides 25 and 26 and the narrow sides 27 and 28 are hinged, as indicated in Fig. 7. The sides 25 and 26 may be held apart by the blocks 29 hinged to the side 25 and abutting against the stops 30 on the side 26. When these blocks are swung out, the sides 25 and 26 may be swung toward each other, and, because of the beveled edges 32 and 33 on the several sides of the core, the narrow sides 27 and 28 may also thereafter be swung toward each other. These movements collapse the core sufficiently to permit it to be drawn out of the molded body. The narrow sides of the mold are drawn against the wide sides by means of the turn-buckle 34 which also holds these sides in their expanded positions.

The bottom 2 of the shell has openings 35 to permit the passage of the flat bars 36 whose bent-over ends 37 carry set screws 38. When the core has been expanded and positioned as shown in Fig. 6, small metal plates 39 are placed between the set screws 38 and the outer face of the bottom 2 over the openings 35 and the screws are turned down hard. This action draws the adjacent ends of the sides of the mold against the packing ring 10 and prevents leakage of water between the core and the bottom 2.

After the mold has been well greased and assembled, and turned up, as shown in Fig. 1, the plastic material is rammed down into the spaces between the shell and expanded core, the final amount being smoothed off flush with the upper end of the shell. If openings are desired in the bottom of the hollow body, bolts 42 and 43 may be secured in the end 24 of the core and the round hubs 44 and 45 secured on these bolts by means of the thumb nuts 46.

When the mold has been filled and the concrete has set, the mold is laid down on the back board 1, the screws 38 are slacked up and these bolts swung out, the screws 6 are slacked up and the sheet metal part 3 of the shell removed, the bottom 2 is swung down giving access to the core, the hubs 44 and 45 are removed, the blocks 29 are swung out and the turn-buckle 34 turned to draw the sides 27 and 28 together and the collapsed core is withdrawn. The hollow body 48 thus molded is shown in Fig. 9.

It is often desirable to secure the tanks thus made to walls and for this purpose I provide the plates 49, shown in Figs. 3, 4 and 9, and form notches in the ledge 50 of the back board 1 to receive the parts 51 of these plates. The central parts of the plates lie against the inner face of the back board when the plastic material is introduced, while the inner parts 53 extend up into the mold so that the plastic mass may flow around them, holes 54 being provided to insure a proper bond. The parts 51 are preferably provided with slots 55 to receive the screws by means of which the tanks may be secured to the wall.

While I have used the word concrete in connection with the plastic material, I do not wish to be limited to a mixture of Portland cement and sand or crushed stone, as any other desirable plastic mixture may be used in the molds of this character. The details and proportions of this mold may all be changed by those skilled in the art without departing from the spirit of my invention as set forth in the following claims.

I claim:—

1. In a mold for hollow bodies, a shell comprising a rigid back board, a bottom hinged thereto, a flexible metal sheet constituting three sides of the shell, and packing strips between the contacting portions of the several members of the shell to prevent the escape of water.

2. In a mold for hollow bodies, a shell comprising a rigid back board, a bottom hinged thereto, a flexible metal sheet constituting three sides of the shell, packing strips between the contacting portions of the several members to prevent the escape of water, and reinforcing strips attached to the edges of the flexible metal sheet to hold such edges in alinement.

3. In a mold for hollow bodies, a shell comprising a rigid back board, a bottom hinged thereto, a flexible metal sheet constituting a plurality of sides of the shell, reinforcing strips attached to the edges of said metal sheet, clamping members adapted to secure the side edges of the metal sheet to said back board, and packing strips between the contacting portions of the several members to prevent the escape of water.

4. In a mold for hollow bodies, a shell comprising a rigid back board, a bottom hinged thereto, a flexible metal sheet constituting a plurality of sides of the shell, reinforcing strips attached to the side edges of said metal sheet, and clamping members adapted to secure the side edges of the metal sheet to said back board.

5. In a mold for hollow bodies, a shell comprising a rigid back board, a bottom hinged thereto, a flexible metal sheet constituting three sides of the mold, and clamping members mounted on the rigid back board adapted to secure the side edges of the metal sheet to the side edges of the back board.

6. In a mold for hollow bodies, a shell comprising a rigid back board, a bottom hinged thereto, a flexible metal sheet constituting three sides of the mold, and clamping members mounted on the rigid back board adapted to secure the side edges of the metal sheet to the side edges of the back board, said bottom having a groove in its edge and a packing strip mounted in the groove and adapted to be engaged by the metal sheet to prevent leakage of water between the bottom and the metal sheet.

7. In a mold for hollow bodies, a shell comprising a rigid back board, a bottom hinged thereto, a flexible metal sheet comprising the remainder of the shell, said bottom having a groove in its edge and a packing strip mounted in the groove, and screws carried by the metal sheet and engaging projections on said back board to draw the metal sheet against the edge of the bottom and with packing strips mounted therein.

8. In a mold for hollow bodies, a shell comprising a rigid back board, a flexible metal sheet constituting the remainder of the shell, slats attached to the edge of the metal sheet, and slidable clamping bars having set screws to engage the slats along the side edges of the metal sheet to draw the same against the back board.

9. In a mold for hollow bodies, a shell comprising a rigid back board, a bottom hinged thereto, a flexible metal sheet constituting the remaining sides of said shell, packing strips between the contacting portions of the several members to prevent the escape of water, slats attached to the edges of the metal sheet, and slidable clamping members mounted on the back board and having set screws to engage the slats along the side edges of the metal sheet to draw the same against the back board.

10. In a mold for hollow bodies, a shell comprising a rigid back board, a bottom, a flexible metal sheet engaging the back board and the bottom, the bottom of the shell having openings, a collapsible core adapted to be attached to the bottom of the shell, bars attached to one end of the core and adapted to pass through said openings in the bottom, screws carried by the ends of the bars, and metal plates extending across the openings in the bottom and engaged by the screws mounted in said bars to secure the core to said bottom in the desired position.

11. In a mold for hollow bodies, a shell comprising a rigid back board, a bottom hinged thereto, a flexible metal sheet constituting three sides of the shell, the bottom of the shell having openings, a collapsible core adapted to be attached to the bottom of the shell, bars attached to one end of the core and adapted to pass through said openings in the bottom, screws carried by the ends of the bars and metal plates extending across the openings in the bottom and engaged by the screws mounted in said bars to secure the core to said bottom, said bottom being formed with a groove in its inner face, and a packing ring mounted in the groove and adapted to be engaged by the ends of the sides of the core to prevent leakage between the floor and bottom.

FREDERICK C. RUPPEL.